W. R. PETERSON.
TANDEM HITCH FOR GROUND TREATING UNITS.
APPLICATION FILED MAY 21, 1917.
1,322,046.
Patented Nov. 18, 1919.
2 SHEETS—SHEET 2
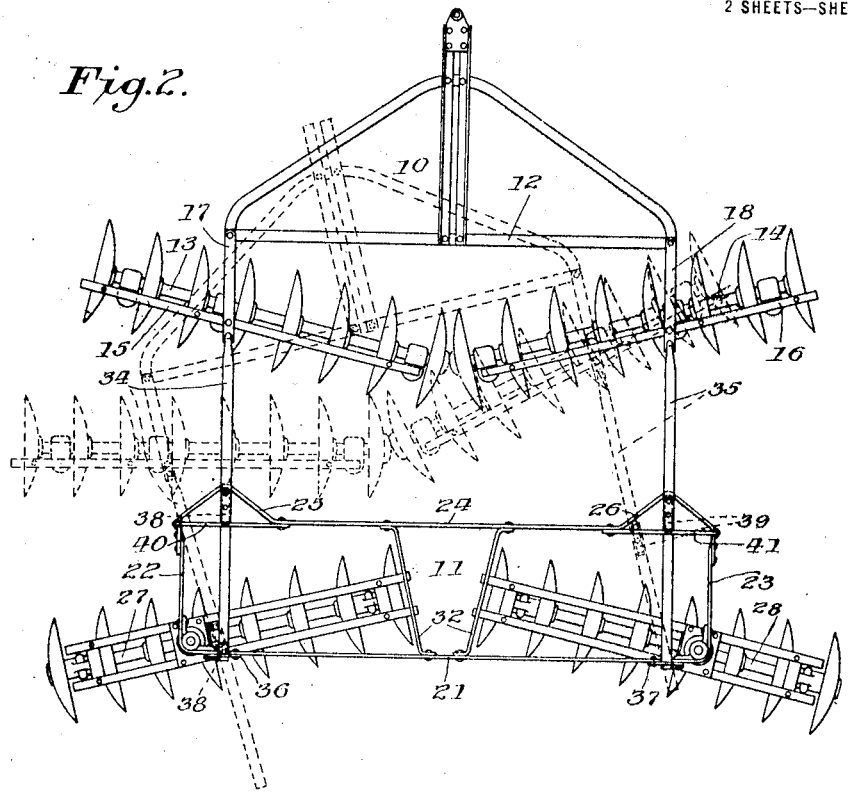
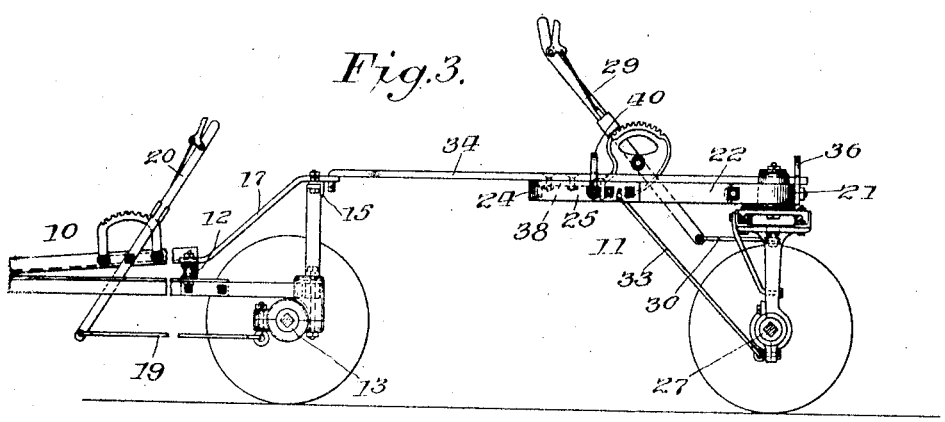
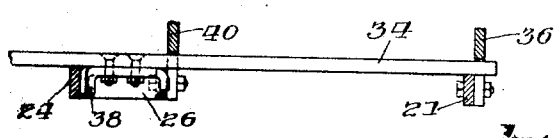
Inventor.
Walter R. Peterson,
by
Atty

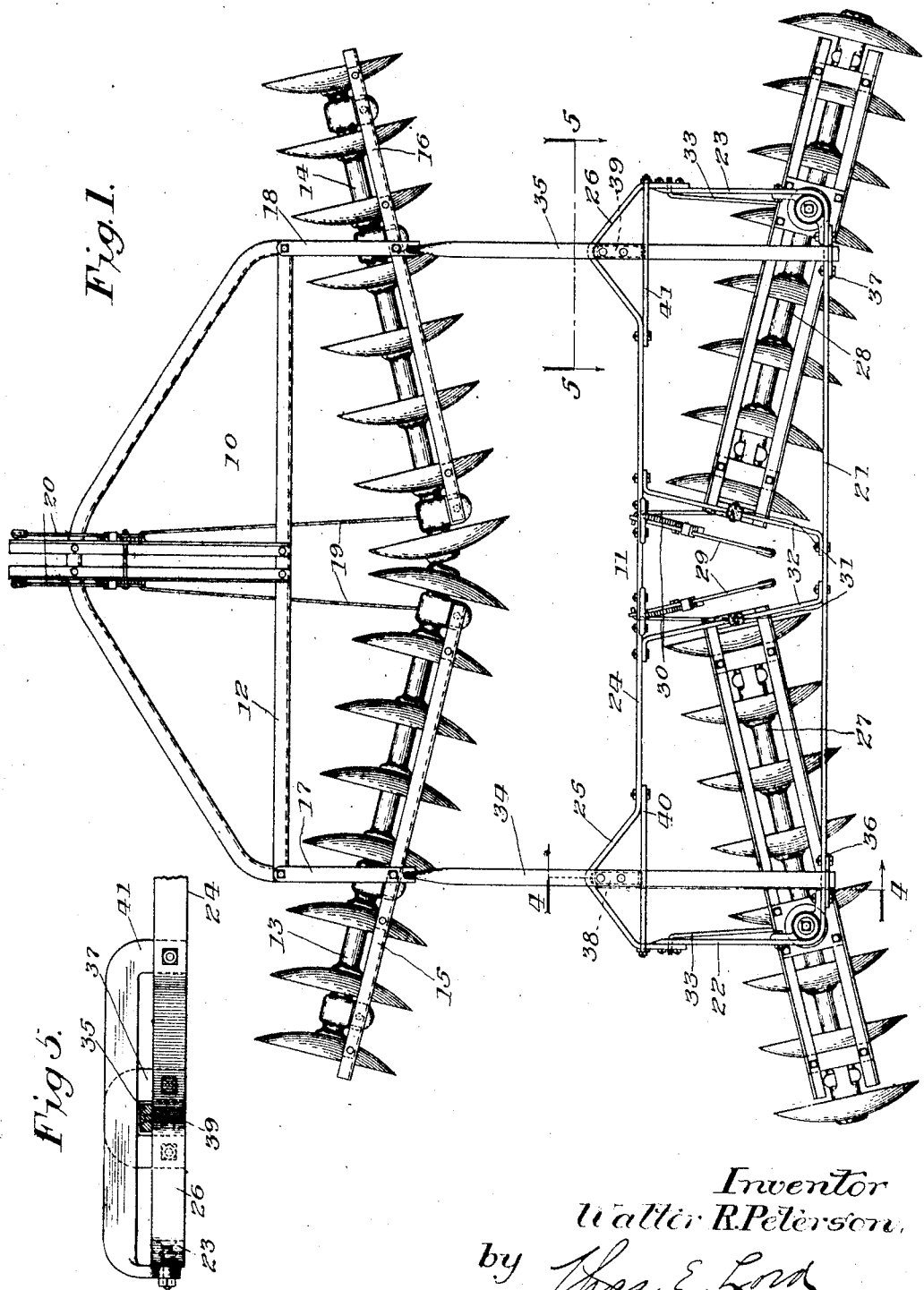

UNITED STATES PATENT OFFICE.

WALTER R. PETERSON, OF CHICAGO, ILLINOIS, ASSIGNOR, BY MESNE ASSIGNMENTS, TO INTERNATIONAL HARVESTER COMPANY, A CORPORATION OF NEW JERSEY.

TANDEM HITCH FOR GROUND-TREATING UNITS.

1,322,046.   Specification of Letters Patent.   Patented Nov. 18, 1919.

Application filed May 21, 1917. Serial No. 170,052.

*To all whom it may concern:*

Be it known that I, WALTER R. PETERSON, a citizen of the United States, residing at Chicago, in the county of Cook and State of Illinois, have invented certain new and useful Improvements in Tandem Hitches for Ground-Treating Units, of which the following is a full, clear, and exact specification.

This invention relates to tandem hitches for ground treating units, and more particularly to tandem hitches for disk harrows.

Two essential requisites for proper operation of double disk harrows are that there shall be flexibility so that the harrow may be easily turned under good and adverse conditions, and that there shall be proper trailing of the rear unit so that ridges of ground made by the front harrow unit will be leveled by the trailing harrow unit. Most of the double disk harrows in use today have one or the other of these requisites, but they do not have both of these requisites, or do not have the same to a desired degree.

It is, therefore, one object of my invention to connect two units in a manner such that there will be flexibility between the various parts and also a proper trailing relationship to accomplish the desired results.

A further object of my invention is to provide a simple, durable and efficient harrow which is adapted to meet all the requirements for successful commercial operation.

These and other objects are accomplished by providing front and rear units and a novel telescopically mounted connection between said units.

The invention is illustrated on the accompanying sheets of drawings, in which—

Figure 1 is a plan view of a double disk harrow embodying my invention;

Fig. 2 is a plan view of the same, showing in dotted lines relative positions which the front harrow unit and rear harrow unit may assume in turning a sharp corner;

Fig. 3 is a partial side elevation with the disk gangs straightened up and showing particularly one of the draft connections between the front and rear units;

Fig. 4 is a view taken in the plane of line 4—4 of Fig. 1 and showing in side elevation the rear portion of one of the draft connecting members between the front and rear units, with the coöperating parts of the rear unit shown in section; and, Fig. 5 is a fragmentary front elevation, parts being in section, taken in the plane of line 5—5 of Fig. 1 and showing the anti-tilting means for the rear unit and draft connection leading from the rear unit toward the front.

The various novel features of my invention will be apparent from the following description and drawings and will be particularly pointed out in the appended claims.

My invention is shown in connection with a double disk harrow having a front unit 10 and rear unit 11 which are flexibly connected in a manner to be considered in detail hereinafter. The front unit includes a frame 12, to which are pivotally connected two disk gangs 13 and 14 which include transversely extending bars 15 and 16. A strap 17 extending rearwardly and upwardly from the frame 12 connects said frame with transverse bar member 15 at one side, and likewise a similar strap 18 connects the frame 12 with transverse bar 16 at the other side of the front unit. Connected to the inner ends of the disk gangs are links 19, which are connected to operating levers 20, whereby the angularity of the front disk gangs may be varied with respect to the line of draft.

The rear unit includes a frame having a rear transverse frame member 21, side frame members 22 and 23, and a front transverse frame member 24 connected to said side frame members and having forwardly extending wedge-shaped portions 25 and 26, the functions of which will be hereinafter described. There are two disk gangs 27 and 28 connected to the rear frame on vertical pivots, one of said disk gangs 27 being pivotally mounted in the left rear corner of the rear frame and the other disk gang 28 being mounted in the right rear corner of the rear frame. The angularity of the rear disk gangs 27 and 28 may be varied with respect to the line of draft by levers 29, which are connected to the inner portions of the disk gangs 27 and 28 by links 30. The inner ends of the rear disk gangs 27 and 28 are held substantinally in a given vertical position in any suitable manner, such as by loop members 31, which are connected to the inner ends of the disk gangs 27 and 28 and looped around forwardly diverging brace bars 32 which connect the front and rear transverse frame bars 21 and 24. The usual links 33 connect the rear disk gangs to the rear frame.

By long experience, it has been found that there must be a great deal of flexibility between the front and rear units of a double disk harrow in order that the harrow may be properly turned without sluing the rear unit and cramping and twisting the frame out of shape.

To make double disk harrows flexible to the desired degree, I have connected the front and rear units in a novel manner by draft bars or links 34 and 35, one of the links 34 being vertically pivoted to the rear end of the link member 17 of the front harrow unit and the other draft link 35 being vertically pivotally connected to the other link 18 of the front harrow unit. These bars or links 34 and 35 are parallel to each other and extend parallel to the normal line of draft and are on opposite sides of the longitudinal center or median line of the harrow. The rear end of the draft link 34 is slidably or telescopically mounted with respect to the rear unit and passes through a loop member 36 connected to the rear frame member 21. Similarly, the rear end of the other draft link member 35 is slidably or telescopically connected to the rear frame member and passes through a loop member 37 also connected to the rear frame member 21. The draft links 34 and 35 are provided with stop members 38 and 39, respectively, on the lower sides thereof, which normally engage the front apexes of the wedge-shaped or triangular members 25 and 26, respectively, for causing the rear unit to travel in a guided manner forwardly with the front unit when said front unit is moved forwardly. Normally, the stop members 38 and 39, respectively, engage the apexes of these oppositely arranged draft connection members 25 and 26, that is to say, when the harrow is traveling forwardly in a straight line, or substantially so. The real test of flexibility occurs when the double disk harrow is making a turn. In many double disk harrows, in making a turn the rear unit is slued around, which is not only undesirable from the standpoint of work, but strains the frame of the machine very seriously and many times permanently twists the frame. With my draft connection a great degree of flexibility is obtained. In making a short turn to the left, as shown in Fig. 2, the rear unit will be drawn entirely by the right hand draft link 35, while the other draft link 34 will telescope or slide rearwardly through the loop member 36 on the rear frame. When making a short turn to the left, as indicated in Fig. 2, the stop member 39 will move laterally to the left along the inside portion of the wedge-shaped member 26. However, under normal operating conditions, the harrow will seldom be turned so short that the stop member 39 will be moved out of the forwardmost portion of the wedge member 26 when the harrow is being turned to the left. Likewise, the other stop member 38 on draft link 34 will seldom move out of the forwardmost portion of the wedge-shaped member 25 when the harrow is being turned to the right. In any event, when the harrow turns into the straightaway path, the draft members immediately center themselves and divide the load, or, in other words, the stop members on the draft links 34 and 35 immediately move into the forwardmost portions of the wedge-shaped members 25 and 26, and, as a matter of fact, they are guided into such position by means of the wedge or cam shape of the members 25 and 26. It will be noted also that when the harrow is turned to the left to a considerable extent, as shown in Fig. 2, the rear portion of stop member 38 on left draft link 34 engages the rear frame member 21 adjacent the loop 36 to assist in turning the rear harrow unit accordingly. In like manner, when the harrow is turned to the right to a considerable extent, the other stop member 39 on right draft link 35 will engage the rear frame member 21 adjacent the loop 37 for a similar purpose. These stop members also limit a rearward movement of the front gangs to prevent contact between the front and rear disks which otherwise might prove disastrous. It will be noted that each of the draft members engages the rear frame at a plurality of points, which assists in preventing a relative lateral swaying movement of the frames. By means of the draft links or members 34 and 35 being telescopically mounted with respect to the rear unit as described, a great degree of flexibility is obtained.

Another desirable and, as a matter of fact, necessary requirement for the successful operation of double disk harrows is that the rear disks properly trail the front disks in a manner to level the ridges which are made by the front disks. This is accomplished by means of the draft connection which I have provided. In other words, by means of this draft connection the rear harrow unit is prevented from swaying to the right or left as it is being drawn forwardly. It trails and properly tracks the front disks in taking a curved path as well as when taking a straight line movement. The two very desirable features, therefore, flexibility and proper trailing of the rear harrow for the purposes stated, are accomplished by means of the draft connection which I have provided between the front and rear units.

In order to prevent forward tilting of the rear disk harrow gangs, I have provided loop members 40 and 41 which are connected to the front frame 24 of the rear unit at the bases of the triangular or wedge-shaped members 25 and 26 and pass over and coöperate with the draft bars 34 and 35.

It is evident that there may be various modifications of my invention as herein particularly shown and described, and it is my intention to cover all such modifications which do not involve a departure from the scope of my invention as set forth in the following claims.

What I claim as new is:

1. In combination, front and rear groups of earth working units, and frame members connecting said front and rear groups including telescopically related elements.

2. In combination, front and rear groups of earth working units, and frame members connecting said front and rear groups including telescopically related elements, one of which is hingedly connected at one end to one of said groups.

3. In combination, front and rear groups of earth working units, and frame members connecting said front and rear groups including telescopically related elements, one of which is flexibly connected at one end to one of said groups.

4. A double harrow, comprising front and rear units, and independent draft connections between said units which telescope with the rear unit.

5. A double harrow, comprising front and rear units, and independent draft connections between said units which are pivotally connected to one of the units and telescope with the other.

6. A double harrow, comprising front and rear units, and independent draft connections between said units which are pivotally connected to the front unit and telescope with the rear unit.

7. In combination, front and rear units including earth working tools, draft connections including draft members hingedly mounted on one unit and having a forward and backward movement relative to said other unit, and means for limiting said forward and backward movement.

8. In combination, front and rear units including earth working tools, draft connections including draft members hingedly mounted on the front unit and having a forward and backward movement relative to said rear unit, and means for limiting said forward and backward movement.

9. In a double harrow, front and rear units, a draft connection between said units which telescopes with one of the units, and means on the rear unit associated with the draft connection to prevent forward tilting of said rear unit.

10. In a double harrow, front and rear units, a connection therebetween flexibly mounted on each unit and means slidably directing said connection for guiding the rear unit to level the ground ridged up by the front unit.

11. In a double harrow, front and rear units, a flexible connection therebetween, and V-shaped means coöperating with said connection for guiding the rear unit to level the ground ridged up by the first unit.

12. In a double harrow, front and rear units, a flexible connection therebetween, and V-shaped means on opposite sides of the median line of the harrow and associated with the connection for guiding the rear unit to level the ground ridged up by the first unit.

13. In a double harrow, front and rear units, a connection therebetween having a relatively sliding movement with respect to the rear unit, and means whereby said connection assumes a given position when both units are moving in a straight line.

14. In a double harrow, front and rear units, and separate flexibly mounted draft members located upon opposite sides of the longitudinal center of the harrow immediately connecting said units and having a sliding movement with respect to one of said units.

15. In a double harrow, front and rear units, and independently movable draft members located upon opposite sides of the longitudinal center of the harrow immediately connecting said units and having a sliding movement with respect to one of said units.

16. In a ground treating implement, front and rear frames, one of said frames having draft guiding means, ground treating tools carried by said front and rear frames, and hinged independent draft connections between said front and rear frames coöperating with said draft guiding means.

17. In a ground treating implement, front and rear frames, the rear frame having draft guiding portions, ground treating tools carried by said frames, and means connecting said front and rear frames and coöperating with said draft guiding portions to insure proper trailing of the rear frame.

18. In a double harrow, front and rear units, the rear unit having draft guiding portions, and connecting means between said front and rear units, said connecting means being adapted to lie in one position with respect to said draft guiding means when the harrow is being drawn in a straight line and in another position when the harrow is taking a curved path.

19. In a double harrow, front and rear units, the rear unit having forwardly converging draft guiding portions, and a connection between said front and rear units having parts which coöperate with said draft guiding portions in a manner to share the draft when going in a straight line and one of which parts takes the draft when going in a curved path.

20. In a ground treating implement, front and rear frames, the rear frame having two draft guiding portions, ground treating tools carried by said frames, and draft bars connecting said front and rear frames and having parts which coöperate with said draft guiding portions for draft purposes.

21. In a ground treating implement, front and rear frames, the rear frame having two draft guiding portions, ground treating tools carried by said frames, draft bars connecting said front and rear frames and having parts which coöperate with said draft guiding portions for draft purposes, and means on said rear frame coöperating with said draft bars to prevent tilting of the rear frame.

22. In a ground treating implement, front and rear frames, ground treating tools carried by said frames, the rear frame having draft guiding portions and loop members, and a draft connection between said front and rear frames coöperating with said draft guiding portions and being slidably mounted through said loop members.

23. In a ground treating implement, front and rear frames, ground treating tools carried thereby, said rear frame having draft guiding means and a loop member, and a draft connection between said frames coöperating with said draft guiding means and being slidably mounted with respect to said loop member.

24. In a ground treating implement, front and rear frames, ground treating tools carried thereby, said rear frame having draft guiding means and a loop member, a draft connection between said frames coöperating with said draft guiding means and being slidably mounted with respect to said loop member, and means to prevent tilting of the rear frame.

25. In a double harrow, front and rear units, the rear unit having a draft guiding portion, and a connection between said front and rear units coöperating with said guiding draft portion for draft purposes, said connection being in one position with respect to said draft guiding portion when the harrow is going in a straight line and being in another position with respect thereto when going in a curved line.

26. In a double harrow, front and rear units, and self alining draft connections having independently movable members between said units, means causing said members to occupy a given position with respect to said rear unit when going in a straight line and which allow said members to pass out of said position when the harrow takes a curved path of a certain degree.

27. In a double harrow, front and rear units, and self alining draft connections having independently movable members between said units, means causing said members to occupy a given position with respect to said rear unit when going in a straight line and which allow said members to pass out of said position when the harrow takes a curved path of a certain degree and which automatically returns to its first position when the harrow again takes a straight path.

28. In a double harrow, front and rear units, a relatively movable draft connection therebetween, and means associated with said connection to limit relative positions of said units.

29. In a ground treating implement, front and rear frames, ground treating tools carried thereby, a relatively movable draft connection between the frames, and stop means associated with said connection and one of said frames to limit relative positions of said frames.

30. In a ground treating implement, front and rear frames, the rear frame having front and rear members, ground treating tools carried by the frames, a draft connection between said frames, and stop means on said connection coöperating with the front and rear members of the rear frame to limit the relative approach and withdrawal of the frames.

31. In a ground treating implement, front and rear frames, ground treating tools carried thereby, and draft members on opposite sides of the median line of draft connected to the front frame and each movable with respect to the rear frame and engaging the rear frame at a plurality of guiding points which position the draft members relatively rigidly with respect to the rear frame during the forward movement of the implement thereby preventing a lateral swaying of one frame with respect to the other.

32. In a ground treating implement, front and rear frames, ground treating tools carried thereby, and draft members on opposite sides of the median line of draft engaging said frames, each of said draft members being movable with respect to both of said frames and engaging one of the frames at a plurality of guiding points which position the draft members relatively rigidly with respect to the rear frame during the forward movement of the implement thereby preventing a relative lateral swaying of said frames.

33. In a double harrow, front and rear units, and separate draft members connecting said units on opposite sides of the median line of draft and having guided sliding connections with the rear of said units, said draft members centering themselves upon a straight line pull exerted upon one of said units.

34. In a ground treating implement, front and rear frames, ground treating tools carried thereby, and relatively movable draft members on opposite sides of the median line of draft connected to said frames. each of said draft members having a sliding movement with respect to one of said frames and engaging one of said frames at a plurality of points to prevent a relative lateral swaying of said frames, said draft members centering themselves upon a straight line pull exerted upon one of the frames.

35. In an implement, front and rear units having frames, connecting members hingedly mounted on one unit and slidably mounted on the frame of the other.

36. In an implement, front and rear units, connecting means hingedly mounted on one unit and slidably mounted on the other, and means associated with the connecting means for normally maintaining the rear unit in a predetermined position.

37. In a double harrow, front and rear units, independent and guidably mounted draft connections therebetween, and means associated with said connections to limit relative movement of said units.

38. In a ground treating implement, front and rear frames, ground treating tools carried thereby, independent and guidably mounted draft connections between the frames and stop means associated with said connections and one of said frames to limit relative movement of said frames.

39. An attachment for a ground treating implement, a frame, ground treating units carried thereby and independent draft members adapted to be pivotally connected to the implement and slidably connected to said frame.

40. An attachment for a ground treating implement, a frame, ground treating units carried thereby and independent draft members adapted to be pivotally connected to the implement and telescopically mounted upon said frame.

41. An attachment for a ground treating implement, a frame, ground treating units carried thereby and independent draft members adapted to be pivotally connected to the implement and telescopically mounted upon said frame, and means for centering said frame with respect to the draft members.

42. In an attachment for an implement, a group of ground treating tools and frame members connected to said group including telescopically related elements.

43. In a ground treating implement, front and rear units, independent rigid draft members connecting said units, and means causing both draft members to operate during the forward movement of the harrow, and but one to operate during the turning movement.

44. In a ground treating implement, front and rear units, independent rigid draft members connecting said units, and means causing both draft members to operate during the forward movement of the harrow, and that member alone opposite the side toward which the implement is turned to operate as a draft member during the turning movement.

45. In a ground treating implement, front and rear units, independent rigid draft members connecting said units, and means causing said members to coöperate to maintain the units in proper relative position when the implement is traveling straight ahead and to act independently when the implement is being turned.

46. In combination, front and rear frames, earth working tools carried thereby, and independently slidable draft elements immediately connecting said frames.

In testimony whereof I affix my signature.

WALTER R. PETERSON.